US006376042B1

(12) United States Patent
Peiffer et al.

(10) Patent No.: US 6,376,042 B1
(45) Date of Patent: Apr. 23, 2002

(54) BIAXIALLY ORIENTED POLYESTER FILM HAVING MORE THAN ONE LAYER; ITS USE; AND PROCESS FOR ITS PRODUCTION

(75) Inventors: Herbert Peiffer, Mainz; Richard Lee Davis, Wiesbaden; Hans Mahl, Walluf, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/295,300

(22) Filed: Apr. 21, 1999

(30) Foreign Application Priority Data

Apr. 22, 1998 (DE) .......................................... 198 17 841

(51) Int. Cl.$^7$ .......................... B32B 15/08; B32B 18/00; B32B 27/06; B32B 27/36
(52) U.S. Cl. ........................ 428/141; 428/336; 428/339; 428/457; 428/458; 428/469; 428/480; 428/910; 264/288.4; 264/290.2
(58) Field of Search ................................ 428/480, 457, 428/458, 910, 469, 141, 336, 339; 264/290.2, 288.4

(56) References Cited

U.S. PATENT DOCUMENTS

| 3,515,626 | A |   | 6/1970  | Duffield            |         |
|-----------|---|---|---------|---------------------|---------|
| 3,958,064 | A |   | 5/1976  | Brekken et al.      |         |
| 4,042,569 | A |   | 8/1977  | Bell et al.         |         |
| 4,252,885 | A |   | 2/1981  | McGrail et al.      |         |
| 4,399,179 | A |   | 8/1983  | Minami et al.       |         |
| 4,493,872 | A | * | 1/1985  | Funderburk et al.   | 428/332 |
| 4,615,939 | A |   | 10/1986 | Corsi et al.        |         |
| 4,622,237 | A |   | 11/1986 | Lori                |         |
| 5,236,680 | A |   | 8/1993  | Nakazawa et al.     |         |
| 5,236,683 | A |   | 8/1993  | Nakazawa et al.     |         |
| 5,242,757 | A | * | 9/1993  | Buisine et al.      | 428/480 |
| 5,429,785 | A |   | 7/1995  | Jolliffe            |         |
| 5,453,260 | A |   | 9/1995  | Nakazawa et al.     |         |
| 5,468,527 | A |   | 11/1995 | Peiffer et al.      |         |
| 5,607,897 | A | * | 3/1997  | Masuda              | 503/227 |

FOREIGN PATENT DOCUMENTS

| DE | 1694404   | 4/1971  |
|----|-----------|---------|
| DE | 2230970   | 2/1973  |
| DE | 3801535   | 7/1988  |
| DE | 4306155   | 9/1994  |
| EP | 0 035 835 | 9/1981  |
| EP | 0 061 769 | 10/1982 |
| EP | 0 088 635 | 9/1983  |
| EP | 0 124 291 | 11/1984 |
| EP | 0 135 451 | 3/1985  |
| EP | 0 144 878 | 6/1985  |
| EP | 0 236 945 | 9/1987  |
| EP | 0 296 620 | 12/1988 |
| EP | 0 347 646 | 12/1989 |
| EP | 0 378 154 | 7/1990  |
| EP | 0 378 955 | 7/1990  |
| EP | 0 402 861 | 12/1990 |
| EP | 0 490 665 | 6/1992  |
| EP | 0 502 745 | 9/1992  |
| EP | 0 514 129 | 11/1992 |
| EP | 0 515 096 | 11/1992 |
| EP | 0 580 404 | 1/1994  |
| EP | 0 602 964 | 6/1994  |
| EP | 0 604 057 | 6/1994  |
| EP | 0 609 060 | 8/1994  |
| EP | 0 612 790 | 8/1994  |
| EP | 0 659 810 | 6/1995  |
| EP | 0 663 286 | 7/1995  |
| EP | 0 685 509 | 12/1995 |
| EP | 0 707 979 | 4/1996  |
| EP | 0 826 478 | 3/1998  |
| JP | 03-292141 A | * 12/1991 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Schmitz, Peter et al., "Films." UIllmann's Encyclopedia of Industrial Chemistry, 5th Ed., vol. A11, pp. 85–110, (1988).*
Kimura, S.F. et al., FTIR Spectroscoscopic Study on Crystallization Process of Poly (ethylene–2,6–naphthalate), 35 Journal of Polymer Science: Polymer Physics 2741–2747 (1997).
Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).
Database WPI, Section Ch, Week 9615, Derwent Publications Ltd., London, GB; (Toray Indus., Inc.) (Feb. 6, 1996).
Database WPI, Section Ch, Week 9522, Derwent Publications Ltd., London, GB; (Toray Indus., Inc.) (Apr. 4, 1995).
Weiss, J., Parameters that influence the barrier properties of metallized polyester and polypropylene films, 204 Thin Solid Films 203–216 (1991).
Derwent Abstract, Acc. No. 98–194495/199818 (DE 9813415 and DE 9813414).

* cited by examiner

*Primary Examiner*—Vivian Chen
(74) *Attorney, Agent, or Firm*—Finnegan, Henderson, Farabow, Garrett & Dunner L.L.P.

(57) ABSTRACT

The invention relates to a biaxially oriented polyester film having at least two layers and which, together with good processing performance, after it has been metalized or has been coated with oxidic materials, is a very good gas or oxygen barrier, and which has been built up from at least one base layer and at least one outer layer applied to this base layer, where the film has a planar orientation $\Delta p$ of greater than 0.165.

19 Claims, No Drawings

BIAXIALLY ORIENTED POLYESTER FILM HAVING MORE THAN ONE LAYER; ITS USE; AND PROCESS FOR ITS PRODUCTION

The invention relates to a transparent, biaxially oriented polyester film which has a base layer composed to an extent of at least 80% by weight of a thermoplastic polyester and has at least one outer layer. The film has good processing performance and good optical properties and, after it has been metalized or has been coated with oxidic materials, is a very good gas or oxygen barrier. The invention relates moreover to the use of the film and to a process for its production.

BACKGROUND OF THE INVENTION

Field of the Invention

Biaxially oriented polyester films are used in packaging and in industry primarily where there is a need for their advantageous properties, i.e. good optical properties, high mechanical strengths, good barrier effect in particular against gases, good dimensional stability when heated and excellent layflat.

In food packaging applications, packaging technology requires a high barrier effect against gases, steam and flavors (this having the same significance as low transmission or low permeability). A well-known process for producing packaging of this type consists in high-vacuum aluminum metalizing of the plastic films used for this purpose. Other well-known processes include coating the films with oxidic materials (e.g. $SiO_x$ or $Al_xO_y$) or water glass. Essentially, the coatings used are transparent.

The barrier effect against the substances mentioned above depends essentially on the type of the polymers in the film and the quality of the barrier layers applied. Thus, a very high barrier effect against gases, such as oxygen and flavors, is achieved in metalized, biaxially oriented polyester films. A barrier effect against steam is achieved in metalized, biaxially oriented polypropylene films.

The good barrier properties of metalized or oxidically coated films mean that they are used in particular for packaging foodstuffs and other consumable items, for which long storage or transport times create the risk that the packaged foods lose flavor and become spoiled rancid if there is an inadequate barrier. Examples of such foodstuffs and consumable items are coffee, snacks containing fats (nuts, potato chips, etc.), and drinks containing carbon dioxide (in pouches).

If polyester films metalized with an aluminum layer or having applied oxidic layers are used as packaging material, they are generally a constituent of a multilayer composite film (laminate). Bags produced therefrom can be filled, for example, on a vertical tubular bag forming, filling and sealing machine. The bags are heat-sealed on their inward side (i.e. on the side facing the contents), the heat-sealable layer consisting, for example, of polyethylene. The composite film here typically has the following structure: polyester layer/aluminum or oxide layer/adhesive layer/heat-sealable layer. The thickness of the metal or oxide layer is only from 10 to 80 nm. Even this very thin functional layer is sufficiently effective to achieve adequate protection from light and very good barrier properties.

The gas or oxygen barrier or the oxygen transmission is generally measured not on the laminate or the packaging itself, but on the metalized polyester film. To ensure good quality of the foods or other consumable items even after relatively long storage times, the oxygen transmission (identical to permeability) of the metalized film may not be greater than 2 $cm^3/(m^2 .bar.d)$, but in particular not greater than 1.5 $cm^3/(m^2.bar.d)$. In the future, the demands of the packaging industry will head toward still higher barriers, with attempts to achieve permeability values of less than 1.0 $cm^3/(m^2 .bar.d)$ for metalized films.

DESCRIPTION OF THE RELATED ARTS

In the prior art, there is neither sufficient knowledge of the detailed basis for the barrier effect of metalized or oxidically coated biaxially oriented polyester films nor of how this may be decisively improved. Variables which are clearly important are the substrate surface, and the substrate polymer and its morphology.

Weiss et al., in "Thin Solids Films" 204 (1991), p. 203–216, studied the influence of the roughness of a substrate layer on permeability. For this study, polyester films were coated with lacquer which contained various concentrations of titanium dioxide particles. In the experiments described, the concentration of titanium dioxide particles in the coating varied from 2 to 20% by weight. Using this method, the roughness $R_a$ of the coated substrate surface could be varied from 43 nm (uncoated and coated film, without titanium dioxide) to 124 nm. In his experiments, increasing roughness (increasing proportion of $TiO_2$) of the coated surface resulted in markedly higher oxygen transmissions after metalizing with aluminum. However, the largest step increase in oxygen transmission was seen when the coated film (0% by weight) was compared with the uncoated film, although the surface roughness of the substrate surface was the same in both cases. Merely coating the film gave a deterioration in the barrier from about 0.43 $cm^3/(m^2 .d.bar)$ (plain film) to about 19 $cm^3/(m^2 .d.bar)$ (coated film). A further uncertainty concerning the transferability of this work to commercial products is created by the fact that the aluminum layer was applied using a laboratory evaporator. When compared with an industrial metalizer, this method achieves essentially low permeability values, and the influence of the substrate surface on the barrier properties cannot be clearly seen.

Other detailed results of studies on the influence of the substrate surface of polyester films on their barrier properties can be found in the dissertation by H. Utz (Technische Universität München 1995: "Barriereeigenschaften Aluminiumbedampfter Kunststoffolien" [Barrier Properties of Aluminum-Metalized Plastic Films]).

EP-A-0 490 665 A1 describes a single-layer biaxially oriented polyester film for magnetic recording tape; the film contains a) from 0.05 to 1.0% by weight of ω-alumina having an average particle diameter in the range from 0.02 to 0.3 μm, and b) from 0.01 to 1.5% by weight of inert particles of a type other than ω-alumina and having an average particle diameter in the range from 0.1 to 1.5 μm, these particles being larger than the ω-alumina particles.

The surface of this film is formed by a large number of elevations/protrusions which are described by the relationship $$-11.4x+4 < \log y < -10.0x+5 \text{ where } y > 30, x > 0.05 \text{ μm.}$$

In this equation, x(μm) is a height above a standard level and y is the number of elevations (number/$mm^2$) if the elevations are sectioned at a height of x. The distribution of the elevations is measured with a standard apparatus for measuring roughness. This text gives no information concerning improvement of the barrier properties, the gloss or the haze.

The prior art also discloses films which have different roughnesses on their two surfaces (dual surface). These films are suitable in particular for magnetic recording media and essentially have different topographies (e.g. surface A smooth, surface B rough). These texts generally provide means of improving the processing properties of the film but not its barrier properties.

EP-B-0 088 635 describes a coextruded biaxially oriented polyester film having at least two layers, of which a layer A consists of thermoplastic resin and a layer B comprises thermoplastic resin and fine particles. The roughness $R_a$ of the outer surface of the layer A in the film is less than 5 nm and the outer surface of the layer B is either a surface having a roughness $R_a$ of from 5 to 40 nm and a large number of depressions and a large number of protrusions which are arranged in a particular arrangement or a surface which has protrusions formed on a level area and which is covered by a layer C, which consists of a lubricant and has a roughness $R_a$ of from 5 to 40 nm.

A disadvantage of film surface A is that it blocks, both with itself and with certain other surfaces (e.g. rubber rolls). The film cannot be processed cost-effectively; in particular during metalizing in vacuo, the film tends to tear because of its high tendency to block, and this can cause great cost problems. The film is unsuitable for the purposes of the object to be achieved.

It is also known that the gas or oxygen barrier can be improved by selecting particular polymers for the film serving as substrate (Schrikker, G.: Metallisierte Kunststoffolien für Höbherwertige Verpackungen [Metalized Plastic films for High-Quality Packaging] in ICI 5th International Metallising Symposium 1986, Cannes). Polyesters, for example, are particularly suitable, specifically those made from ethyleneglycol and terephthalic acid or from ethyleneglycol, terephthalic acid and naphthalene-2,6-dicarboxylic acid. Besides these, polyamides, ethylene-vinyl alcohol copolymers (EVOH) and polyvinylidene chloride may also be used with advantage. Thus, for example, U.S. Pat. No. 5,506,014 describes a copolyester made from (a) from 45 to 85 mol% of terephthalic acid, (b) from 10 to 40 mol % of naphthalenedicarboxylic acid and (c) from 5 to 15 mol % of a dicarboxylic acid having from 2 to 8 carbon atoms and (d) ethyleneglycol; (the molar percentages are based on the total proportion of dicarboxylic acids). This polyester is claimed to have better barrier properties against gases. It is used, inter alia, for producing bottles or containers and films of various thicknesses. A disadvantage of the raw materials mentioned is that they are significantly more expensive than polyethylene terephthalate (PET) or are unsuitable and/or not officially permitted for use in food packaging applications.

DESCRIPTION OF THE INVENTION

It has been an object of the present invention to provide a coextruded biaxially oriented polyester film which, after it has been metalized or has been coated with oxidic materials, is a very good gas or oxygen barrier. The film should moreover have good optical properties (low haze, high gloss) and be easy to produce and to process (low coefficient of friction).

The gas or oxygen permeability of the film after it has been metalized should be less than 1.0 cm$^3$/(m$^2$ d bar). The gas or oxygen permeability of the film after it has been coated with oxidic materials should be less than 3.0 cm$^3$/(m$^2$ d bar). The gloss of the film should be greater than 170, and its haze less than 2.0%. In its other properties, the film should be at least equivalent to the known packaging films of this type. In addition, it should be simple and cost-effective to produce, and it should process well on conventional machinery. The coefficient of friction on at least one of the two surfaces should be less than 0.5.

The object has been achieved by means of a biaxially oriented coextruded polyester film which has at least two layers and has a base layer which is composed to an extent of at least 80% by weight of a thermoplastic polyester, and has at least one outer layer which comprises internal and/or inert particles, where the film has a planar orientation Δp of greater than 0.165.

Internal particles are understood as meaning catalyst residues remaining in the raw material during preparation of the polyester.

Inert particles are taken as meaning particles which are added to the raw material, for example during its preparation.

According to the invention, to achieve the desired oxygen permeability of metalized or oxidically coated films, the planar orientation Δp of the novel film must be greater than 0.165.

To achieve good gas or oxygen barriers in metalized or oxidically coated PET films, a high planar orientation Δp is therefore required. If the planar orientation Δp of the film is smaller than the value given above (cf. FIG. 1) then the barrier in the above sense is poor, but if the planar orientation Δp of the film is greater than the value given above then the barrier in the above sense is good.

In a preferred embodiment of the novel film, the planar orientation Δp of the novel film is greater than 0.166 and in a very particularly preferred embodiment greater than 0.1665.

In the preferred and particularly preferred embodiments, the novel film in its metalized or oxidically coated form is a particularly good gas or oxygen barrier.

It has moreover proven advantageous for achieving a high barrier if the refractive index $n_z$ in the direction of the thickness of the film is less than a defined value. This value is $n_z$ =1.495.

According to the invention, the film is built up from at least two layers and has, on one side of layer B (=base layer), the outer layer A. Both layers may comprise the pigments beneficial to the production and processing of the film.

In a particularly preferred embodiment, the novel polyester film is built up from three layers and then comprises the two outer layers A and C. The thickness and formulation of the second outer layer C may be selected independently of the outer layer A. Like layer A, the outer layer C may comprise the polymers or polymer mixtures. However, it may also comprise other common outer-layer polymers.

Various raw materials can in principle be used for the materials of the various layers. However, it is preferable to use polyester raw materials as starting materials in preparing the individual layers.

The base layer of the film is preferably composed to an extent of at least 90% by weight of a thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethyl-cyclohexane and terephthalic acid (=poly-1,4-cyclohexanedimethylene terephthalate, PCDT) or from ethylene glycol, naphthalene-2,6-dicarboxylic acid and biphenyl-4,4'-dicarboxylic acid (=polyethylene 2,6-naphthalate dibenzoate, PENBB). Particular preference is given to polyesters which are composed to an extent of at least 90 mol %, preferably at least 95 mol %, of ethylene glycol and terephthalic acid units or of ethylene glycol and naphthalene-2,6-dicarboxylic acid units. The remaining monomer units are derived from other aliphatic, cycloaliphatic or aromatic diols and dicarboxylic acids, which may also be present in the layer A (or the layer C).

Examples of other suitable aliphatic diols are diethylene glycol, triethylene glycol, aliphatic glycols of the formula $HO-(CH_2)_n-OH$, where n is an integer from 3 to 6, (in particular 1,3-propanediol, 1,4-butanediol, 1,5-pentanediol and 1,6-hexanediol), or branched aliphatic glycols having up to 6 carbon atoms. Of the cycloaliphatic diols, cyclohexanediols (in particular 1,4-cyclohexanediol) should be mentioned. Examples of other suitable aromatic diols are those of the formula $HO-C_6H_4-X-C_6H_4-OH$, where X is $-CH_2-$, $-C(CH_3)_2-$, $-C(CF_3)_2-$, $-O-$, $-S-$ or $-SO2-$. Besides these, bisphenols of the formula $HO-C_6H_4-C_6H_4-OH$ are also very suitable.

Other preferred aromatic dicarboxylic acids are benzenedicarboxylic acids, naphthalenedicarboxylic acids (for example naphthalene-1,4- or 6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene4,4'-dicarboxylic acid) and stilbene-x,x'-dicarboxylic acids. Of the cycloaliphatic dicarboxylic acids, mention should be made of cyclohexanedicarboxylic acids (in particular cyclohexane-1,4-dicarboxylic acid). Particularly suitable aliphatic dicarboxylic acids are the $C_3-C_{19}$-alkanedioic acids, the alkane part of which may be straight-chain or branched.

The polyesters may be prepared by the transesterification process, the starting materials for which are dicarboxylic esters and diols, which are reacted using the customary transesterification catalysts, such as salts of zinc, calcium, lithium, magnesium and manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

In principle, the same polymers may be used for the outer layers as for the base layer. Besides these, other materials may also be present in the outer layers, in which case the outer layers are preferably composed of a mixture of polymers, of a copolymer or of a homopolymer which contain ethylene 2,6-naphthalate units and ethylene terephthalate units. Up to 10 mol % of the polymers may be composed of other comonomers (see above).

For processing the polymers, it has proven useful to select the polymers for the base layer and the other layers in such a way that the viscosities of the respective polymer melts do not differ excessively. Otherwise it is likely that there will be flow disturbances or streaking in the finished film. To describe the viscosity ranges of the two melts, use is made of a modified solution viscosity (SV). For commercially available polyethylene terephthalates which are suitable for producing biaxially oriented films, the SV values are in the range from 600 to 1000. For the purposes of the present invention, to ensure satisfactory film quality, the SV of the polymers for the layers A or C should be in the range from 300 to 1200, preferably in the range from 400 to 1 150, particularly preferably in the range from 500 to 1000. If desired, a solid phase condensation may be carried out on the respective granules in order to adjust the SV values of the materials as necessary. As a general rule, the melt viscosities of the polymer melts for the base layer and the other layers should not differ by more than a factor of 5, preferably by not more than a factor of from 2 to 3.

The base layer and the other layers may also contain customary additives, such as stabilizers and/or anti-blocking agents. They are expediently added to the polymer or to the polymer mixture before melting takes place. Examples of stabilizers are phosphorus compounds, such as phosphoric acid and phosphoric esters.

Typical antiblocking agents (also termed pigments in this context) are inorganic and/or organic particles, for example calcium carbonate, amorphous silicic acid, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin and crosslinked polystyrene particles and crosslinked acrylate particles.

Selected additives may also be mixtures of two or more different antiblocking agents or mixtures of anti-blocking agents of the same formulation but of different particle size. The particles may be added to the individual layers in the respective advantageous concentrations, e.g. as glycolic dispersion during the polycondensation or via masterbatches during extrusion. Pigment concentrations of from 0 to 5% by weight have proven particularly suitable. A detailed description of antiblocking agents is found, for example, in EP-A-0 602 964.

Preferred particles are $SiO_2$ in colloidal and in chain form. These particles are bound very effectively into the polymer matrix, and create vacuoles to only a very slight extent. Vacuoles generally cause haze and it is therefore expedient to avoid them. There is no limit in principle on the particle diameters of the particles used. However, to achieve the object of the invention it has proven advantageous to use particles having an average primary particle diameter of less than 100 nm, preferably less than 60 nm and particularly preferably less than 50 nm and/or particles having an average primary particle diameter of greater than 1 μm, preferably greater than 1.5 μm and particularly preferably greater than 2 μm.

The pigmentation of the individual layers unrelated to the outer layers can therefore vary greatly and depends essentially on the structure of the film (layer structure) and the requirements of the film with respect to achievement of other optical properties (haze), and on the behavior in production and processing.

If the film is the preferred three-layer film with the base layer B and the two outer layers A and C, then the particle concentration in the base layer B is preferably lower than in the outer layers. In the case of a three-layer film of the type specified, the particle concentration in the base layer B is from 0 to 0.15% by weight, preferably from 0 to 0.12% by weight and in particular from 0 to 0.10% by weight. There is in principle no restriction on the diameter of the particles used, but particular preference is given to particles with an average diameter of greater than 1 μm.

To achieve the film properties specified above, in particular the permeability values for the film after metalization/ coating with oxidic materials, it has moreover proven advantageous if the film surfaces have specific topographies. For at least one surface of the films described here, the number N of elevations (per mm$^2$) and the height h (in $\mu$m) and the diameter d (in $\mu$m) of the elevations should be linked by the following equations:

$$1 - 3.7 * \log h/\mu m < \log N/mm^2 < 2.48 - 2.22 * \log h/\mu m$$

where 0.05 $\mu$m<h<1.00 $\mu$m  (1)

$$1.7 - 3.86 * \log d/\mu m < \log N/mm^2 < 4.7 - 2.7 * \log d/\mu m$$

where 0.2 $\mu$m<d<10 $\mu$m  (2)

N in number/mm$^2$
h in $\mu$m
d in $\mu$m.

For the films described here it has, furthermore, proven advantageous if the film surface which subsequently is metalized or is coated with oxidic materials obeys the following conditions:

$$\log N/mm^2 < 1.4 - 2.5 * \log h/\mu m$$  (3)

where 0.05 $\mu$m<h<1.00 $\mu$m $$\log N/mm^2 < 3.4 - 2.4 * \log d/\mu m$$  (4)

where 0.2 $\mu$m<d<10 $\mu$m

N in number/mm$^2$
h in $\mu$m
d in $\mu$m.

In a very particularly preferred embodiment, $R_a$ of at least one side of the film is from 30 to 90 nm and in particular from 35 to 80 nm.

The roughnesses and surface topographies described above are achieved by the addition (and/or presence) in the outer layer(s), and possibly also in the base, of the particles described above.

If desired, there may also be an intermediate layer between the base layer and the outer layers. This also may be composed of the polymers described for the base layers. In a particularly preferred embodiment, it is composed of the polyester used for the base layer. It may also contain the customary additives described. The thickness of the intermediate layer is generally greater than 0.3 $\mu$m and is preferably in the range from 0.5 to 15 $\mu$m, particularly preferably in the range from 1.0 to 10 $\mu$m and very particularly preferably in the range from 1.0 to 5 $\mu$m.

In the particularly advantageous three-layer embodiment of the novel film, the thicknesses of the outer layers A and C are generally greater than 0.1 $\mu$m and are in the range from 0.2 to 4.0 $\mu$m, preferably in the range from 0.2 to 3.0 $\mu$m, particularly preferably in the range from 0.3 to 2.5 $\mu$m and very particularly preferably in the range from 0.3 to 2.0 $\mu$m; the outer layers A and C here may have the same or different thicknesses.

The total thickness of the novel polyester film can vary within wide limits and depends on the intended application. It is from 4 to 50 $\mu$m, in particular from 5 to 45 $\mu$m, preferably from 6 to 40 $\mu$m, the layer B being preferably in a proportion of from about 10 to 90% of the total thickness.

To prepare the layers A and C (outer layer(s) A and C), it is expedient to feed pellets of polyethylene terephthalate to one or two extruders. The materials are melted at about 300° C. and extruded.

The polymers for the base layer are expediently fed through another extruder. Any foreign bodies or contamination which may be present can be screened out from the polymer melt before extrusion. The melts are then shaped in a coextrusion die to give flat melt films, and are laminated together. The multilayer film is then drawn off and solidified with the aid of a chill roll and, if desired, other rolls.

The biaxial orientation is generally carried out sequentially. For this, it is preferable to orientate firstly in a longitudinal direction (i.e. in the machine direction, =MD) and then in a transverse direction (i.e. perpendicularly to the machine direction, =TD). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. The planar orientation $\Delta p$ of >0.164 can, for example, be obtained by varying the parameters in machine-direction-stretching and/or in transverse-direction-stretching and/or by varying the SV value of the employed raw material. Specifically the amounts of stretching in machine-direction and in transverse-direction ($\Lambda_{MD}$ and $\Lambda_{TD}$), the stretching temperatures in machine-direction and in transverse-direction ($T_{MD}$ and $T_{TD}$), the line speed and the kind of stretching specifically the kind of stretching in machine-direction have an influence on the planar orientation. If, for instance, a line yields a planar orientation of $\Delta p=0.162$ with the parameters $\Lambda_{MD}=4.3$ and $\Lambda_{TD}=4.0$, $T_{MD}=80$ to 125° C. and $T_{TD}=80$ to 135° C., a planar orientation $\Delta p$, which is in the claimed range, can be obtained by lowering the MD stretching temperature to $T_{MD}=80$ to 118° C. or by lowering the TD stretching temperature to $T_{TD}=80$ to 125° C. or by lowering the MD stretch ration to $\Lambda_{MD}=4.9$ or by raising the TD stretch ration to $\Lambda_{TD}=4.5$. In the above example the line speed was 340 m/min and the SV value of the raw material was 730. Before the transverse stretching, one or both surface(s) of the film may be in-line coated by the known processes. The in-line coating can, for example, serve to improve adhesion of the metallic layer or of any printing ink which may be applied, or else to improve antistatic or processing performance.

In the subsequent heat-setting, the film is held for from about 0.1 to 10 s at a temperature of from 150 to 250° C. The film is then reeled up in a customary manner.

Before applying the metallic or oxidic layer on one or both side(s), the biaxially oriented and heat-set polyester film may be corona- or flame-treated. The intensity of treatment is selected so that the surface tension of the film is generally greater than 45 mN/m.

Metallic or oxidic layers are applied in customary industrial systems. Metallic layers of aluminum are usually produced by conventional metalizing (boat method). For oxidic layers, electron-beam processes or application by sputtering have also proven successful. The process parameters for the system during application of the metallic or oxidic layer to the films correspond to the standard conditions. The metalization of the films is preferably carried out so that the optical density of the metalized films is in the usual range from about 2.2 to 2.8. The oxidic layer is applied to the film in such a way that the thickness of the oxidic layer is preferably in the range from 30 to 100 nm. The web speed of the film to be coated is from 5 to 20 m/s for all settings of variables. A laboratory metalization system was not used for metalizing, since experience has shown that the barrier values are then generally significantly better and cannot be used for comparative purposes.

The film may also be chemically pretreated to establish other desired properties. Typical coatings are layers which promote adhesion, are antistatic, improve slip or have release action. These additional coatings may be applied to the film via in-line coating using aqueous dispersions, before the transverse orientation.

If the film is metalized, the metallic layer is preferably composed of aluminum. However, other materials which can be applied in the form of a thin, cohesive layer are also suitable. Silicon, for example, is particularly suitable and, in contrast to aluminum, gives a transparent barrier layer. The oxidic layer is preferably composed of oxides of elements of the 2nd, 3rd or 4th main group of the Periodic Table, in particular oxides of magnesium, aluminum or silicon. Use is generally made of those metallic or oxidic materials which can be applied at reduced pressure or in vacuo.

It is a further advantage of the invention that the production costs of the novel film are comparable with those in the prior art. The other properties of the novel film which are relevant to its processing and use are essentially unchanged or even improved. Besides this, it has been ensured that recycled material can be used during the production of the film in a concentration of from 10 to 50% by weight, preferably 20 to 50% by weight, based on the total weight of the film, without any significant adverse effect on the physical properties of the film.

The film has excellent suitability for packaging of food and other consumable items which, in both instances, are sensitive to light and/or air. Besides this, it is also extremely suitable for industrial use, e.g. in producing hot-stamping foils. It is particularly suitable for producing vacuum packs for coffee, in particular ground coffee.

In summary, the novel film is an excellent gas or oxygen barrier after it has been metalized or has been coated with oxidic materials. In addition, it has the good processing performance desired, in particular on high-speed processing machinery, and has high gloss and low haze.

The gloss of the film surface A is greater than 170. In a preferred embodiment the gloss of the film is greater than 175 and in a particularly preferred embodiment greater than 180. The film is therefore suitable in particular for printing or metalizing. The high gloss of the film is transferred to the print or the applied metallic layer and thus imparts to the film the effective presentational appearance which is wanted.

The haze of the film is less than 2.0. In a preferred embodiment, the haze of the film is less than 1.9, and in a particularly preferred embodiment less than 1.8.

The processing and reeling performance of the film, in particular on high-speed machinery (reelers, metalizers, printing and laminating machines) is extremely good. The coefficient of friction of the film, which at least on one side is less than 0.5, is a measure of its processing performance. In a preferred embodiment, the coefficient is less than 0.45, and in a particularly preferred embodiment less than 0.40. Besides a good thickness profile, excellent layflat and low coefficient of friction, the reeling performance is decisively affected by the roughness of the film. It has become apparent that the reeling of the film is particularly good if the average roughness, at least on one side of the film, is in a range from 30 to 90 nm, while the other properties are retained unchanged. In a preferred embodiment, the average roughness is in a range from 35 to 80 nm, and in a particularly preferred embodiment in a range from 40 to 60 nm.

The table below (Table 1) shows once again the most important film properties in accordance with the invention.

TABLE 1

| | Range according to the invention | Preferred | Particularly preferred | Unit | Measurement method |
| --- | --- | --- | --- | --- | --- |
| Planar orientation Δp | >0.165 | >0.166 | >0.1665 | | Internal |
| Oxygen permeability of the metalized film | <1 | <0.85 | <0.7 | g m$^{-2}$ d$^{-1}$ bar$^{-1}$ | DIN 53 380, Part 3 |
| Refractive index n$_z$ | <1.495 | <1.494 | <1.493 | | Internal |
| Gloss (measurement angle 20°)[i)] | >170 | >175 | >180 | | DIN 67 530 |
| Haze[i)] | <2.0 | <1.9 | <1.8 | % | ASTM-D 1003-52 |
| Coefficient of friction | <0.5 | <0.45 | <0.40 | | DIN 53 375 |
| Average roughness R$_a$ | 30–90 | 35–80 | 40–60 | nm | DIN 4768 with a cut-off of 0.25 mm |

[i)]Measured on the unmetalized film

The following methods were used to determine parameters for the raw materials and the films:

(1) Optical density

The Macbeth TD-904 Densitometer from Macbeth (Division of Kollmorgen Instruments Corp.) was used to measure the optical density. The optical density is defined as OD=−lg l/l$_o$, where l is the intensity of the incident light, l$_o$ is the intensity of the transmitted light and l/l$_o$ is the transmittance.

(2) Oxygen barrier

The oxygen barrier of the metalized films was measured using an OX-TRAN 2/20 from Mocon Modern Controls (USA) in accordance with DIN 53 380, Part 3.

(3) Determination of the planar orientation Δp

The planar orientation is determined by measuring the refractive index with an Abbe refractometer using the following procedure:

Preparation of specimens

| | | |
| --- | --- | --- |
| Specimen size | Specimen length: | from 60 to 100 mm |
| | Specimen width: | corresponds to prism width of 10 mm |

To determine n$_{MD}$ and n$_\alpha$(=n), the specimen to be measured must be cut out from the film; the running edge of the specimen must run precisely in direction TD. To determine n$_{TD}$ and n$_\alpha$(=n$_z$), the specimen to be measured must be cut out from the film; the running edge of the specimen must run precisely in direction MD. The specimens are to be taken from the middle of the film web. Care must be taken that the Abbe refractometer is at a temperature of 23° C.

Using a glass rod, a little diiodomethane (n=1.745) or diiodomethane-bromonaphthalene mixture is applied to the lower prism, which is cleaned thoroughly before the measurement procedure. The refractive index of the mixture must be greater than 1.685. The specimen cut out in direction TD is firstly laid on top of this, in such a way that the entire surface of the prism is covered. Using a paper wipe, the film is now firmly pressed flat onto the prism, so that it is firmly and smoothly positioned thereon. The excess of liquid must be sucked away. A little of the test liquid is then dropped onto the film. The second prism is swung down into place and pressed firmly into contact. The indicator scale is now turned until a transition from light to dark can be seen in the field of view in the range from 1.62 to 1.68. If the transition from light to dark is not sharp, the colors are brought together in such a way that only one light and one dark zone is visible. The sharp transition line is brought to the crossing point of the two diagonal lines (in the eyepiece). The value now indicated on the measurement scale is read off and entered into the test record. This is the refractive index $n_{MD}$ in the machine direction. The scale is now turned until the range visible in the eyepiece is from 1.49 to 1.50.

The refractive index $n_\alpha$ or $n_z$ (in the direction of the thickness of the film) is now determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together in such a way that a sharp transition can be seen. This sharp transition line is placed on the crossing point of the two diagonal lines and the value indicated on the scale is read off and entered into the table.

The specimen is then turned, and the corresponding refractive indices $n_{MD}$ and $n_\alpha(=n_z)$ of the other side are measured and entered into an appropriate table.

After determination of the refractive indices in, respectively, direction MD and the thickness direction, the specimen strip cut out in direction MD is placed in position and the refractive indices $n_{TD}$ and $n_3$ $(=n_z)$ are determined in a corresponding manner. The strip is turned over, and the values for the B side are measured. The values for the A side and the B side are combined to give average refractive indices. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)3$$

(4) SV

The SV (solution viscosity) was determined by dissolving a specimen of polyester in a solvent (dichloroacetic acid, concentration: 1 % by weight). The viscosity of this solution and that of the pure solvent were measured in an Ubbelohde viscometer. The quotient (=relative viscosity $\eta_{rel}$) was determined from the two values, 1.000 was subtracted from this, and this value multiplied by 1000. The result was the SV (solution viscosity).

(5) Coefficient of friction

The coefficient of friction was determined according to DIN 53 375, 14 days after production.

(6) Surface tension

The surface tension was determined using the "ink method" (DIN 53 364).

(7) Haze

The haze of the film was measured according to ASTM-D 1003-52. The Hölz haze was determined by a method based on ASTM-D 1003-52, but, in order to utilize the most effective measurement range, measurements were made on four pieces of film laid one on top of the other, and a 1° slit diaphragm was used instead of a 4° pinhole.

(8) Gloss

Gloss was measured according to DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed, representing the light beams hitting the photoelectric detector. The value measured is dimensionless and must be stated together with the angle of incidence.

(9) Determination of the particle sizes on film surfaces

A scanning electron microscope and an image analysis system were used to determine the size distribution of elevations on film surfaces. Use is made of the XL30 CP scanning electron microscope from Philips with an integrated image analysis program: Analysis from Soft-imaging System.

For these measurements, specimens of film are placed flat on a specimen holder. These are then metalized obliquely at an angle a with a thin metallic layer (e.g. of silver). $\alpha$ here is the angle between the surface of the specimen and the direction of diffusion of the metal vapor. This oblique metalization throws a shadow behind the elevation. Since the shadows are not yet electrically conductive, the specimen is then further sputtered or metalized with a second metal (e.g. gold), the second coating here impacting vertically onto the surface of the specimen in such a way that it does not result in any shadows in the second coating.

Scanning electron microscope (SEM) images are taken of the specimen surfaces prepared in this way. The shadows of the elevations are visible because of the contrast of the metallic materials. The specimen is oriented in the SEM so that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with a N×N filter (size 3, 1 iteration). A frame is set so as to ensure that elevations which are not reproduced in their entirety in the image are not included in the measurements. The enlargement, the size of frame and the number of images evaluated are selected in such a way that a total film surface of 0.36 mm² is evaluated.

The height of the individual elevations is computed from the individual shadow lengths using the following relationship:

$$h = (\tan \alpha) * L$$

where h is the height of the elevation, $\alpha$ is the metalization angle and L is the shadow length. The elevations registered in this way are classified so as to arrive at a frequency distribution. The classification is into classes of 0.05 μm width between 0 and 1 μm, the smallest class (0 to 0.05 μm) not being used for further evaluation calculations. The diameters of the elevations (the spread in the direction perpendicular to that in which the shadow is thrown) are graded in a similar manner in classes of 0.2 μm width from 0 to 10 μm, the smallest class here again being used for further evaluation.

(11) Roughness

The roughness $R_a$ of the film was determined according to DIN 4768 with a cut-off of 0.25 mm.

EXAMPLE 1

Polyethylene terephthalate chips (prepared via the transesterification process using Mn as transesterification catalyst; Mn concentration: 100 ppm) were dried at 160° C. to a residual moisture of less than 50 ppm and fed to the extruder for the base layer B.

In addition, polyethylene terephthalate chips (prepared via the transesterification process using Mn as transesterification catalyst; Mn concentration: 100 ppm) which have been pigmented as shown in Table 2 were likewise dried at 160° C. to a residual moisture of less than 50 ppm and fed to the respective extruders for the outer layer.

A transparent AB film having two layers and a total thickness of 12 μm was produced by coextrusion followed by stepwise orientation in longitudinal and transverse directions. The thickness of the respective layers is given in Table 2.

Outer layers A:

| | |
|---|---|
| 84.0% by weight | of polyethylene terephthalate RT 49 from Hoechst AG with an SV of 800 |
| 16.0% by weight | of masterbatch made from 99.0% by weight of polyethylene terephthalate (SV of 800) and 0.5% by weight of Sylobloc 44 H (colloidal SiO$_2$ from Grace) and 0.5% by weight of Aerosil TT 600 (chain SiO$_2$ from Degussa) |

Base layer B:

| | |
|---|---|
| 90.0% by weight | of polyethylene terephthalate RT 49 from Hoechst AG with an SV of 800 |
| 10.0% by weight | of masterbatch made from 99.0% by weight of polyethylene terephthalate (SV of 800) and 0.5% by weight of Sylobloc 44 H (colloidal SiO$_2$ from Grace) and 0.5% by weight of Aerosil TT 600 (chain SiO$_2$ from Degussa). |

The production conditions for the individual process steps were:

| | | |
|---|---|---|
| Extrusion: | Temperatures Layer A: | 300° C. |
| | Layer B: | 300° C. |
| | Layer C: | 300° C. |
| | Temperature of the take-off roll: | 30° C. |
| | Die gap width: | 1 mm |
| Longitudinal stretching: | Temperature: | 80–120° C. |
| | Longitudinal stretching ratio: 4.3 | |
| Transverse stretching: | Temperature: | 80–135° C. |
| | Transverse stretching ratio: | 4.0 |

-continued

| | | |
|---|---|---|
| Setting: | Temperature: | 230° C. |
| Duration: | | 3 s |

The film has very good optical properties and good processing performance (cf. Table 3).

After the film had been produced (in this example and in all examples below) it was metalized on side A with aluminum in vacuo in an industrial metalizer.

The coating speed was 8 m/s and the optical density was 2.6.

The film exhibited the required gas or oxygen barrier. The structure of the film and the properties achieved in films produced in this way are presented in Tables 2 and 3.

EXAMPLE 2

A transparent film having three layers, ABA structure and a total thickness of 12 μm was produced by coextrusion followed by stepwise orientation in longitudinal and transverse directions.

Outer layers A are a mixture of:

| | |
|---|---|
| 84.0% by weight | of polyethylene terephthalate RT 49 from Hoechst AG with an SV of 800 |
| 16.0% by weight | of masterbatch made from 99.0% by weight of polyethyleneterephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 3

A transparent film having three layers, ABC structure and a total thickness of 12 μm was produced by coextrusion followed by stepwise orientation in longitudinal and transverse directions. Only the outer layers were changed in comparison with Example 2.

| | |
|---|---|
| 96.0% by weight | of polyethylene terephthalate RT 49 from Hoechst A(3 with an SV of 800 |
| 4.0% by weight | of masterbatch made from 99.0% by weight of polyethylene terephthalate (SV of 800) and 0.5% by weight of Sylobloc 44 H (Grace) and 0.5% by weight of Aerosil TT 600 (Degussa) |

Outer layer C is a mixture of:

| | |
|---|---|
| 84.0% by weight | of polyethylene terephthalate RT 49 from Hoechst AG with an SV of 800 |
| 16.0% by weight | of masterbatch made from 99.0% by weight of polyethylene terephthalate (SV of 800) and 0.5% by weight of Sylobloc 44 H (Grace) and 0.5% by weight of Aerosil TT 600 (Degussa) |

The process conditions selected for all layers were as in Example 1.

EXAMPLE 4

A transparent film having three layers, ABC structure and a total thickness of 12 μm was produced by coextrusion followed by stepwise orientation in longitudinal and trans verse directions. Only the outer layer A was changed in comparison with Example 3. Outer layer A is a mixture of:

| | |
|---|---|
| 99.0% by weight | of polyethylene terephthalate RT 49 from Hoechst AG with an SV of 800 |
| 1.0% by weight | of masterbatch made from 99.75% by weight of polyethylene terephthalate (SV of 800) and 0.25% by weight of Aerosil TT 600 (Degussa) |

The process conditions selected for all layers were as in Example 1.

EXAMPLE 5

A transparent film having three layers, ABC structure and a total thickness of 12 μm was produced by coextrusion followed by stepwise orientation in longitudinal and transverse directions. Only the conditions for longitudinal stretching were changed in comparison with Example 3.

Longitudinal stretching: Temperature: 80 –117° C.
Longitudinal stretching ratio: 4.3

EXAMPLE 6

A transparent film having three layers, ABC structure and a total thickness of 12 μm was produced by coextrusion followed by stepwise orientation in longitudinal and transverse directions. Only the outer layer A was changed in comparison with Example 3.

Outer layer A is a mixture of:

| | |
|---|---|
| 99.0% by weight | of polyethylene-2,6-naphthalate (Polyclear P 100 prepolymer from Hoechst AG) with an SV of 600 |
| 1.0% by weight | of masterbatch made from 99.75% by weight of polyethylene terephthalate (SV of 800) and 0.25% by weight of Aerosil TT 600 (Degussa) |

The process conditions selected for all layers were as in Example 1. In this example, the planar orientation is measured from side C.

Comparative Example 1

A transparent film having three layers, ABC structure and a total thickness of 12 μm was produced by coextrusion followed by stepwise orientation in longitudinal and transverse directions. Only the conditions of longitudinal stretching were changed in comparison with Example 3.

Longitudinal stretching: Temperature: 80 –125° C.
Longitudinal stretching ratio: 4.1

After metalization, the film did not have the required barrier values.

TABLE 2

| | Film thickness | Film | Layer thicknesses A B C | Pigments in the layers | | | Average pigment diameter | | | Pigment concentrations | | |
|---|---|---|---|---|---|---|---|---|---|---|---|---|
| Example | μm | structure | μm | A | B | C | A | B | C | A | B | C |
| | | | | | | | μm | | | ppm | | |
| E 1 | 12 | AB | 1.5/10.5 | Sylobloc 44 H Aerosil TT 600 | Sylobloc 44 H Aerosil TT 600 | none | 2.5 0.04 | 2.5 0.04 | | 800 800 | 500 500 | 0 0 |
| E 2 | 12 | ABA | 1.5/9.0/1.5 | Sylobloc 44 H Aerosil TT 600 | none | Sylobloc 44 H Aerosil TT 600 | 2.5 0.04 | | 2.5 0.04 | 800 800 | 0 0 | 800 800 |
| E 3 | 12 | ABC | 1.5/9.0/1.5 | Sylobloc 44 H Aerosil TT 600 | none | Sylobloc 44 H Aerosil TT 600 | 2.5 0.04 | | 2.5 0.04 | 200 200 | 0 0 | 800 800 |
| E 4 | 12 | ABC | 1.5/9.0/1.5 | Sylobloc 44 H Aerosil TT 600 | none | Sylobloc 44 H Aerosil TT 600 | 2.5 0.04 | | 2.5 0.04 | 50 50 | 0 0 | 800 800 |
| E 5 | 12 | ABC | 1.5/9.0/1.5 | Sylobloc 44 H Aerosil TT 600 | none | Sylobloc 44 H Aerosil TT 600 | 2.5 0.04 | | 2.5 0.04 | 200 200 | 0 0 | 800 800 |
| E 6 | 12 | ABC | 1.5/9.0/1.5 | Sylobloc 44 H Aerosil TT 600 | none | Sylobloc 44 H Aerosil TT 600 | 2.5 0.04 | | 2.5 0.04 | 50 50 | 0 0 | 800 800 |
| CE 1 | 12 | ABC | 1.5/9.0/1.5 | Sylobloc 44 H Aerosil TT 600 | none | Sylobloc 44 H Aerosil TT 600 | 2.5 0.04 | | 2.5 0.04 | 200 200 | 0 0 | 800 800 |

TABLE 3

| | Planar orientation | Oxygen barrier | Constants for the height distribution of the particles | | Constants for the thickness distribution of the particles | | Coefficient of friction | | Roughness $R_a$ | | Gloss[i] | | Haze[i] | Processing |
|---|---|---|---|---|---|---|---|---|---|---|---|---|---|---|
| | | | $A_h$ | $B_h$ | $A_d$ | $B_d$ | μk | | Side | Side | Side | Side | | |
| Example | Δp | cm³/(m² bar d) | Side A/Side C | | Side A/Side C | | A/A | C/C | A | C | A | C | % | behavior |
| E 1 | 0.166 | 0.8 | 2.2/1.3 | 2.6/2.7 | 2.3/3.0 | 3.1/2.4 | 0.46 | 0.46 | 45 | 40 | 175 | 180 | 1.9 | good |
| E 2 | 0.166 | 0.8 | 2.2/2.2 | 2.6/2.6 | 2.3/2.3 | 3.1/3.1 | 0.4 | 0.4 | 50 | 52 | 195 | 195 | 1.6 | good |
| E 3 | 0.166 | 0.5 | 1.25/2.2 | 1.65/2.6 | 3.3/2.3 | 2.8/3.1 | 0.6 | 0.4 | 25 | 56 | 200 | 190 | 1.4 | good |
| E 4 | 0.166 | 0.4 | 1.2/2.2 | 1.5/2.6 | 3.18/2.3 | 3.5/3.1 | 0.9 | 0.4 | 15 | 55 | 210 | 190 | 1.3 | good |
| E 5 | 0.168 | 0.3 | 1.25/2.2 | 1.65/2.6 | 3.3/2.3 | 2.8/3.1 | 0.6 | 0.4 | 25 | 55 | 195 | 190 | 1.4 | good |

TABLE 3-continued

| Example | Planar orientation $\Delta p$ | Oxygen barrier $cm^3/(m^2\ bar\ d)$ | Constants for the height distribution of the particles $A_h$ $B_h$ Side A/Side C | Constants for the thickness distribution of the particles $A_d$ $B_d$ Side A/Side C | Coefficient of friction $\mu k$ A/A C/C | Roughness $R_a$ Side A Side C nm | Gloss[i] Side A Side C | Haze[i] % | Processing behavior |
|---|---|---|---|---|---|---|---|---|---|
| E 6 | 0.166 | 0.08 | 1.2/2.2 1.5/2.6 | 3.18/2.3 3.5/3.1 | 0.9 0.4 | 12 50 | 210 185 | 1.2 | good |
| CE 1 | 0.162 | 2.2 | 1.25/2.2 1.65/2.6 | 3.3/2.3 2.8/3.1 | 0.6 0.4 | 24 55 | 195 180 | 1.5 | good |

[i]Measured on the unmetalized film
Side A: Metalized outer layer. The oxygen barrier was measured on the metalized film
Side C: Unmetalized outer layer

What is claimed is:

1. A biaxially oriented coextruded polyester film which has at least two layers comprising:
   (A) a base layer, at least 80% by weight of which is composed of a thermoplastic polyester; and
   (B) at least one outer layer, which comprises internal and/or inert particles, wherein the film has a planar orientation $\Delta p$ of greater than 0.165, and wherein, for at least one surface of the film, the number N of elevations per $mm^2$, the height h in $\mu m$, and the diameter d in $\mu m$ of the elevations are linked by the following equations:

$$-1-3.7*\log h/\mu m < \log N/mm^2 < 2.48-2.22*\log h/\mu m \quad (1)$$

where $0.05\ \mu m < h < 1.00\ \mu m$, and $$1.7-3.86*\log d/\mu m < \log N/mm^2 < 4.7-2.7*\log d/\mu m \quad (2)$$

where $0.2\ \mu m < d < 10\ \mu m$.

2. A polyester film as claimed in claim 1, wherein the planar orientation of the film $\Delta p$ is greater than 0.166.

3. A polyester film as claimed in claim 1, wherein the planar orientation of the film $\Delta p$ is greater than 0.1665.

4. A polyester film as claimed in claim 1, which has been metallized and wherein the metallized film has an oxygen transmission of less than 1.0 $cm^3/(m^2\ bar\ d)$.

5. A polyester film as claimed in claim 1, which has been metallized and wherein the metallized film has an oxygen transmission of less than 0.80 $cm^3/(m^2\ bar\ d)$.

6. A polyester film as claimed in claim 1, wherein the outer layer(s) has/have a thickness of from 0.1 to 4.0 $\mu m$.

7. A polyester film as claimed in claim 1, wherein the film is built up from three layers and is composed of:
   (A) the outward-facing outer layer A; and
   (B) the base layer B; and
   (C) an outer layer C, which has been applied to the side of the base layer B opposite to the outer layer A.

8. A polyester film as claimed in claim 1, wherein the outer layers are pigmented.

9. A polyester film as claimed in claim 1, wherein the outer layers are differently pigmented.

10. A polyester film as claimed in claim 1, wherein at least one outward-facing outer layer has been in-line coated.

11. A process for producing a biaxially oriented polyester film having more than one layer as claimed in claim 1, which comprises:
    (A) feeding polyester melts, corresponding to the formulations of the outer and base layers, to a coextrusion die;
    (B) extruding the result from step (A) onto a cooling roll; and
    (C) biaxially orienting and heat-setting the resultant prefilm,
    wherein the planar orientation$\Delta\Delta p$ of the film obtained is greater than 0.165.

12. The process of claim 11, wherein the biaxial orientation of the film is carried out sequentially.

13. The process of claim 11, wherein the sequential biaxial orientation is carried out by first orienting the prefilm in a longitudinal direction, and then in a transverse direction.

14. The process for producing a biaxially oriented polyester film having more than one layer as claimed in claim 11, in which recycled material is fed to the extrusion die at a concentration of from 10 to 50% by weight, based on the total weight of the film.

15. The process of claim 11, wherein the biaxially oriented and heat-set film is subsequently corona—or flame treated.

16. The process of claim 11, wherein metallic or oxidic layers are applied to the biaxially oriented polyester film.

17. The process of claim 11, wherein the biaxially oriented polyester film is chemically pretreated to promote adhesion, promote release action, suppress static electricity, or to improve slip.

18. A method for packaging foodstuffs and other consumable items, comprising packaging said foodstuffs and other comsumable items in a film as claimed in claim 1.

19. A method for producing hot-stamping foils, comprising providing a film as claimed in claim I to produce the foil.

* * * * *

UNITED STATES PATENT AND TRADEMARK OFFICE
CERTIFICATE OF CORRECTION

PATENT NO. : 6,376,042 B1
DATED : April 23, 2002
INVENTOR(S) : Peiffer et al.

It is certified that error appears in the above-identified patent and that said Letters Patent is hereby corrected as shown below:

<u>Title page,</u>
Item [57], ABSTRACT,
Line 8, "0.165." should read:
-- 0.165, wherein for at last one surface of the film, the number N of elevations per mm$^2$, the height h in $\mu$m, and the diameter d in $\mu$m of the elevations are linked by the following equations:

-1-3.7 * log h/$\mu$m < log N/mm$^2$ < 2.48-2.22 * log h/$\mu$m  (1)

where 0.05 $\mu$m < h < 1.00 $\mu$m, and 1.7-3.86 * log d/$\mu$m < log N/mm$^2$ < 4.7-2.7 * log d/$\mu$m  (2)

where 0.2 $\mu$m < d < 10 $\mu$m. --

<u>Column 17,</u>
Line 31, equation (1), "long" should read -- log --.
Line 35, equation (2), "long" should read -- log --.

<u>Column 18,</u>
Line 31, "orientation$\Delta$Ap" should read -- orientation $\Delta$p --.
Line 45, "corona—or" should read -- corona- or --.
Line 57, "claim I" should read -- claim 1 --.

Signed and Sealed this

Third Day of September, 2002

*Attest:*

*Attesting Officer*

JAMES E. ROGAN
*Director of the United States Patent and Trademark Office*